United States Patent
Spiess et al.

(10) Patent No.: US 7,372,808 B2
(45) Date of Patent: May 13, 2008

(54) REDUNDANT TRANSMISSION OF PROTECTION COMMANDS BETWEEN REMOTE TRIPPING DEVICES

(75) Inventors: Hermann Spiess, Habsburg (CH); Michael Strittmatter, Zurzach (CH); Mathias Kranich, Albbruck (DE)

(73) Assignee: ABB Schweiz AG, Baden (CH)

( * ) Notice: Subject to any disclaimer, the term of this patent is extended or adjusted under 35 U.S.C. 154(b) by 1031 days.

(21) Appl. No.: 10/396,838

(22) Filed: Mar. 26, 2003

(65) Prior Publication Data
US 2003/0189899 A1    Oct. 9, 2003

(30) Foreign Application Priority Data
Apr. 9, 2002   (EP) .................. 02405283

(51) Int. Cl.
*H02H 3/05*   (2006.01)
*H02H 7/26*   (2006.01)

(52) U.S. Cl. ........................ 370/228; 361/62

(58) Field of Classification Search ............. 370/227, 370/228; 361/62, 64
See application file for complete search history.

(56) References Cited
U.S. PATENT DOCUMENTS

| | | | | |
|---|---|---|---|---|
| 3,626,297 A | * | 12/1971 | Green et al. ............ | 370/206 |
| 3,940,566 A | * | 2/1976 | Jeppsson et al. .......... | 370/216 |
| 4,093,825 A | * | 6/1978 | Gladstone et al. ........ | 379/122 |
| 4,380,814 A | * | 4/1983 | Shinmyo ................ | 375/267 |
| 4,698,802 A | * | 10/1987 | Goke et al. ............ | 370/535 |
| 4,819,225 A | * | 4/1989 | Hochstein .............. | 370/216 |
| 5,034,966 A | * | 7/1991 | Hochstein .............. | 375/267 |
| 5,065,396 A | * | 11/1991 | Castellano et al. ...... | 370/536 |
| 5,267,231 A | | 11/1993 | Dzieduszko | |
| 5,577,196 A | * | 11/1996 | Peer .................. | 714/4 |
| 6,604,137 B2 | * | 8/2003 | Cowan et al. .......... | 709/224 |
| 6,680,954 B1 | * | 1/2004 | Cam et al. ............ | 370/474 |

FOREIGN PATENT DOCUMENTS

| | | |
|---|---|---|
| EP | 0311251 A2 | 4/1989 |
| WO | WO99/63635 | 12/1999 |

* cited by examiner

*Primary Examiner*—Melvin Marcelo
(74) *Attorney, Agent, or Firm*—Buchanan Ingersoll & Rooney PC

(57) ABSTRACT

In a method and a device for redundant transmission of protection commands between remote tripping devices (1, 8), useful information which represents a protection command or a rest signal is transmitted by a first remote tripping device (1) in at least two time slots via a first interface (2) to a first multiplexer (3), and is transmitted via different transmission paths (4, 5) by the multiplexer (3) based on the time slots. A second multiplexer (6) receives the useful information via the different transmission paths (4, 5), and transmits each useful information item via a time slot, which is allocated to the respective transmission path (4, 5), in a second interface (7) to a second remote tripping device (8).

16 Claims, 1 Drawing Sheet

REDUNDANT TRANSMISSION OF PROTECTION COMMANDS BETWEEN REMOTE TRIPPING DEVICES

This application claims priority under 35 U.S.C. §§ 119 and/or 365 to Appln. No. 02405283.9 filed in Europe on Apr. 9, 2002; the entire content of which is hereby incorporated by reference.

FIELD OF THE INVENTION

The invention relates to the field of protection technology for high-voltage and medium-voltage networks. It relates to a method and to a device for redundant transmission of protection commands between remote tripping devices as claimed in the precharacterizing clauses of patent claims 1 and 5.

BACKGROUND OF THE INVENTION

Remote tripping devices or protection signal transmission devices are used for transmitting protection or switching commands in electrical high-voltage and medium-voltage networks and systems, for example for distance protection. Protection commands result, by way of example, in direct or indirect opening of a circuit breaker, and hence in electrical disconnection of a part of the network or of the system. Conversely, other protection commands result in the opening of a circuit breaker being blocked. In a rest case, that is to say when no protection command is being transmitted, a rest signal or guard signal is transmitted continuously instead of this.

Protection commands need to be transmitted, for example, from one section of a high-voltage line to another. To do this, a transmitter in a remote tripping device produces digital signals on the basis of the protection commands, which digital signals are transmitted via a digital signal connection, for example using an E1 (Synchronous Digital Hierarchy, SDH) or T1 (SONET) communication standard. A receiver in another remote tripping device detects the transmitted signals, and determines the corresponding number and nature of the protection commands. In order to ensure transmission despite channel failures, redundant transmission means are provided. In this case, by way of example, the receiver receives on a first channel and, if the channel is interrupted, is switched to a second channel. The switching time which is required for this purpose is, however, 20 ms to 50 ms, which is too long for protection signal transmission. A solution in which each protection device uses two interfaces to separate transmission paths is too complex.

SUMMARY OF THE INVENTION

The object of the invention is therefore to provide a method and a device for redundant transmission of protection commands between remote tripping devices of the type mentioned initially, which method and device overcome the disadvantages mentioned above.

This object is achieved by a method and a device for redundant transmission of protection commands between remote tripping devices, having the features of patent claims 1 and 5.

In the method and device according to the invention for redundant transmission of protection commands between remote tripping devices, useful information is thus transmitted by a first remote tripping device in at least two time slots via a first interface to a first multiplexer, and is transmitted by the multiplexer via different transmission paths, as a function of the time slots.

Only a single interface is thus required at the remote tripping device for redundant transmission.

In one preferred embodiment of the invention, the useful information is received in a second multiplexer and is transmitted in an associated time slot via a second interface to the second remote tripping device, as appropriate for the respective transmission path.

In consequence, only a single interface is also required in the receiving remote tripping device, and redundant signals are received without any need for switching between transmission paths or channels.

Further preferred embodiments are described in the dependent patent claims.

BRIEF DESCRIPTION OF THE DRAWINGS

The subject matter of the invention will be explained in more detail in the following text using a preferred exemplary embodiment which is illustrated in the attached drawing. The FIGURE shows, schematically, a device for redundant transmission of protection commands between remote tripping devices. The reference symbols used in the drawing and their meanings are listed in summarized form in the list of reference symbols.

DETAILED DESCRIPTION OF THE INVENTION

Figure 1:
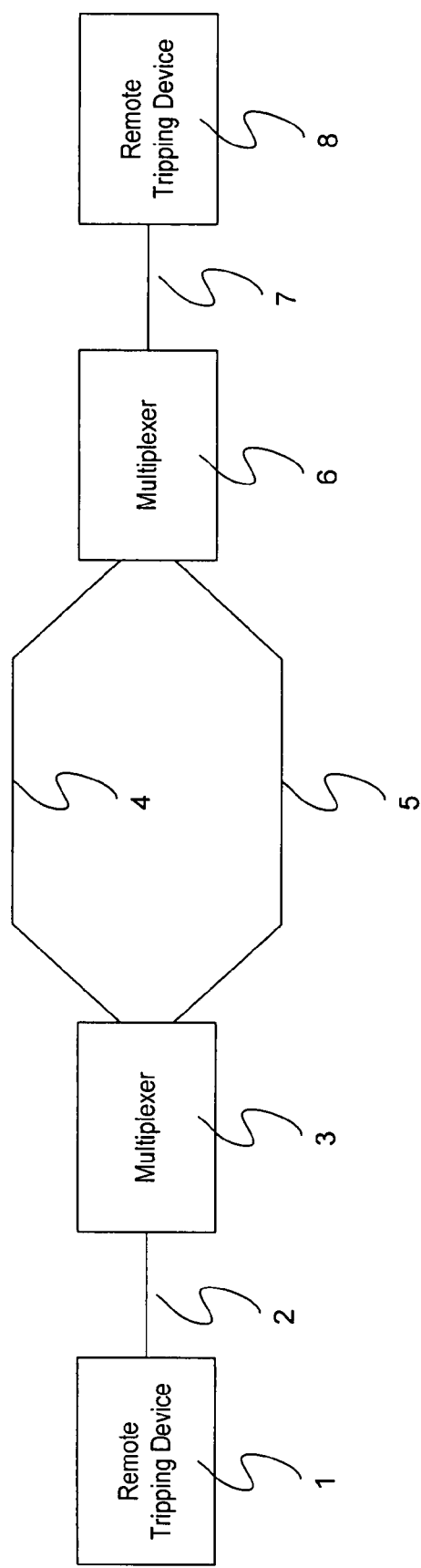

FIG. 1 show, schematically, a device for redundant transmission of protection commands between remote tripping devices. In this FIGURE, a first remote tripping device 1 is connected via a first interface 2 to a first multiplexer 3. At least one first transmission path 4 and one second transmission path 5 pass on from the first multiplexer 3, with the transmission paths or transmission channels 4, 5 being different than one another, to a second multiplexer 6, which is connected via a second interface 7 to a second remote tripping device 8.

The first interface 2 and the second interface 7 are, for example, known, standardized E1 or T1 interfaces. In a data transmission system according to the T1 standard, data bytes from 24 channels are converted into a bit stream using a time-division multiplexing method; there are 30 channels in the E1 standard. The bit stream is subdivided into a sequence of data frames, with one data frame comprising a synchronization bit and in each case one data byte of the individual channels. Successive data bytes of a specific channel are thus transmitted in periodically occurring time slots.

According to the invention, a useful information item which represents a protection command or a rest signal is transmitted as a bit pattern via not only one but via at least two channels of the interface. This transmission takes place in the same data frame, or in an immediately adjacent data frame, that is to say essentially at the same time.

The multiplexers 3, 6 are used in a known manner to subdivide signals which are received on one or more interfaces between other interfaces, transmission paths or transmission channels. The first multiplexer 3 is configured such that at least two of the channels or time slots are each allocated to one specific transmission path 4, 5. The transmission paths 4, 5 correspond to physically different lines and connections in a digital communications network of any topology, for example in accordance with a Synchronous Digital Hierarchy (SDH) Standard. Such a standard defines, for example, point-to-point communications links via relay stations or router stations, which correspond to the transmission paths 4, 5 used here between the multiplexers 3, 6.

Since the same useful information is transmitted essentially at the same time in different time slots, and the time slots are allocated to different transmission paths 4, 5, this results in redundant transmission of the useful information via different transmission paths 4, 5. More than two time slots and transmission paths can in this case be used, without any further problems, for multiple redundant transmission. The time slots or channels which are not used on the first interface 2 and in the first multiplexer 3 are available for other purposes.

The second interface 7 likewise operates using a time-division multiplexing method, but not necessarily using the same method as the first interface 2. The second multiplexer 6 transmits useful information, which is received on a specific transmission path 4, 5, to an associated time slot in the second interface 7. If none of the transmission paths 4, 5 is interrupted, the second remote tripping device 8 thus receives the same useful information twice, and in different time slots in the second interface 7. Although the second remote tripping device 8 requires twice as much computation power to evaluate the useful signals which are received twice, it does not require any additional hardware, however.

If the useful information represents a protection command or switching command, a combined protection command is formed, in one preferred embodiment of the invention, by a nonexclusive OR logic operation from a protection command which has been transmitted via the first transmission path 4 and from a protection command which is redundant with respect to the first protection command and has been transmitted via the second transmission path 5. Thus, if one of the transmission paths 4, 5 is interrupted, the combined protection command is nevertheless formed without any switching delay.

The different transmission delays mean that it is possible for a switching command which is transmitted via the first transmission path 4 not to be received at the second remote tripping device 8 before the transmission via the second transmission path 5 has reached the second remote tripping device 8. In this case, after the OR logic operation, the second remote tripping device 8 would receive the switching command twice. In order to avoid this, either the switching command is sent by the first remote tripping device 1 at least during a time period which corresponds to the maximum delay time difference between the transmission paths 4, 5 plus a safety margin, or the combined switching command is in each case emitted having been lengthened by this time period after the OR logic operation. This procedure is also referred to as command lengthening or command prolongation, with typical values being 5 to 100 ms or more. This ensures that, when a delayed switching command arrives, the switching command or the combined switching command which has already arrived is still active.

A further advantage of the invention is that only interfaces 2, 7 and multiplexers 3, 6 which are required in any case are used. No additional hardware complexity is therefore required, just suitable programming of the multiplexers 3, 6 and of the remote tripping devices 1, 8.

The invention claimed is:

1. A method for redundant transmission of protection commands between remote tripping devices, comprising:
   transmitting information from a first remote tripping device in at least two time slots via a first interface to a first multiplexer, said information controlling, by a second remote tripping device, the operation of a circuit breaker or a switch;
   allocating each of the time slots a respective one of a plurality of transmission paths; and
   transmitting the information from the first multiplexer in each of the time slots via the respective one of the plurality of transmission paths.

2. The method as claimed in claim 1, comprising:
   receiving the information from at least one of the plurality of transmission paths at a second multiplexer, wherein
   allocating each of the plurality of transmission paths a respective time slot in a second interface; and
   transmitting, by the second multiplexer, the information received from the at least one transmission path in the respective time slot via the second interface to the second remote tripping device.

3. The method of claim 2, comprising:
   forming a combined switch command for the second remote tripping device from at least two redundantly transmitted switch commands by means of an OR logic operation.

4. The method of claim 3, comprising:
   lengthening the combined switch command is by a predetermined time period.

5. A device for redundant transmission of protection commands between remote tripping devices, comprising:
   a first remote tripping device configured to redundantly transmit information in at least two time slots via a first interface to a first multiplexer, wherein
      the information controls, by a second remote tripping device, the operation of a circuit breaker or a switch, and
      the first multiplexer is configured to transmit the information in each time slot via a transmission path which is allocated to a respective one of the time slots.

6. The device of claim 5, comprising:
   a second multiplexer configured to receive the information from the at least two transmission paths and to transmit the information on each transmission path in the time slots which are respectively allocated to the transmission paths, via the second interface to the second remote tripping device.

7. The device claim 6, comprising: means for performing the OR logic operation of at least two redundantly transmitted switch commands to form a combined switch command.

8. The device as claimed in claim 7, having means for lengthening the time duration of the combined switch command by a time period which can be predetermined.

9. A method for redundant transmission of information from a first remote tripping device to a second remote tripping device, comprising:
   allocating a first plurality of timeslots included in a time-division multiplexed data frame to a respective plurality of communication channels;
   transmitting a protection command from the first remote tripping device over the allocated communication channels at substantially the same time, said protection command controlling, by the second remote tripping device, the operation of a circuit breaker or a switch;
   receiving the protection command from at least one of the allocated communication channels at the second remote tripping device, the allocated transmission channels being associated with a respective second plurality of timeslots; and switching, by the second remote tripping device, a circuit breaker or a switch based on the protection command in at least one of the second plurality of timeslots.

10. The method of claim 9, wherein transmitting includes:
receiving the data frame including the first plurality of timeslots; and
transmitting the first plurality of timeslots over the allocated communication channels.

11. The method of claim 10, wherein receiving includes:
receiving the first plurality of timeslots from the at least one of the allocated communication channels; and
transmitting the first plurality timeslots to the respective second plurality of timeslots in the second remote tripping device.

12. The method of claim 9, wherein the plurality of communication channels have different transmission paths.

13. A system for redundant transmission of information, comprising:
a first remote tripping device configured to:
allocate a first plurality of timeslots included in a time-division multiplexed data frame to a respective plurality of communication channels, and
transmit a protection command from the first remote tripping device over the allocated communication channels at substantially the same time, said protection command controlling, by another remote tripping device, the operation of a circuit breaker or a switch; and
a second remote tripping device configured to:
receive the protection command from at least one of the allocated communication channels at the second remote tripping device, the allocated transmission channels being associated with a respective second plurality of timeslots, and
operate a circuit breaker or a switch based on the protection command in at least one of the second plurality of timeslots.

14. The system of claim 13, comprising a first multiplexer configured to:
receive the data frame including the first plurality of timeslots; and
transmit the first plurality of timeslots over the allocated communication channels.

15. The system of claim 14, comprising a second multiplexer configured to:
receive the first plurality of timeslots from the at least one of the allocated communication channels; and
transmit the first plurality timeslots to the respective second plurality of timeslots in the second remote tripping device.

16. The system of claim 13, wherein the plurality of communication channels have different transmission paths.

* * * * *